March 4, 1924.
W. LOEFFLER
PULLEY
Filed July 23, 1921
1,485,621
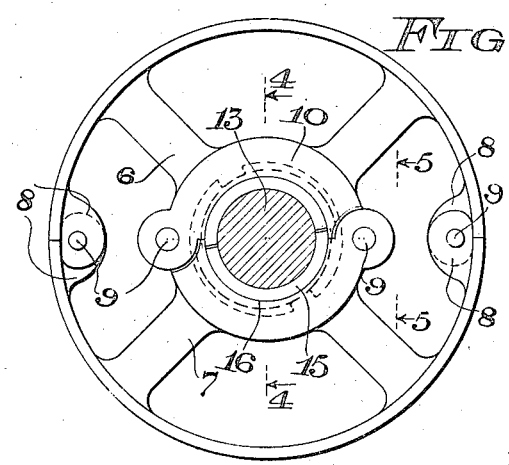
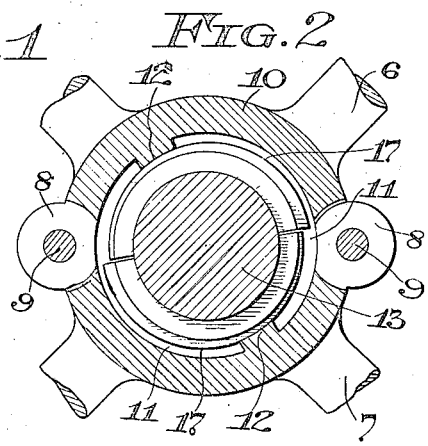
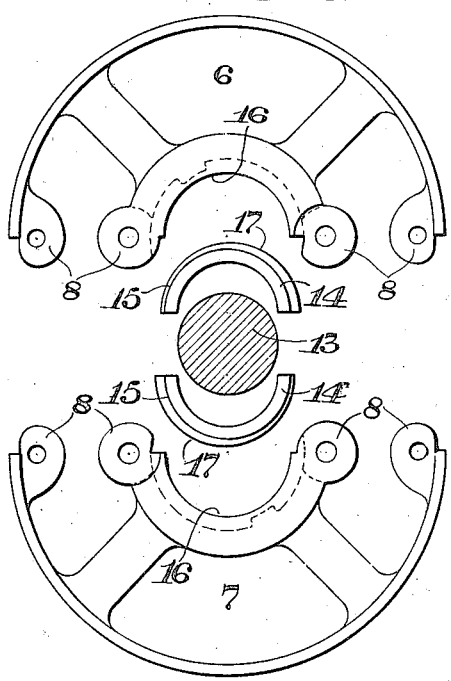
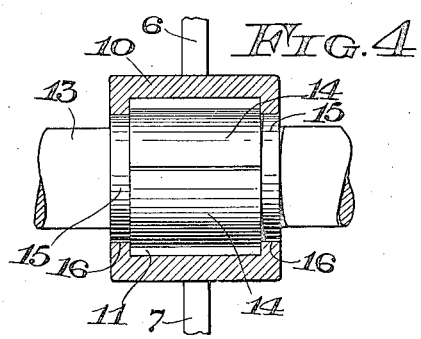
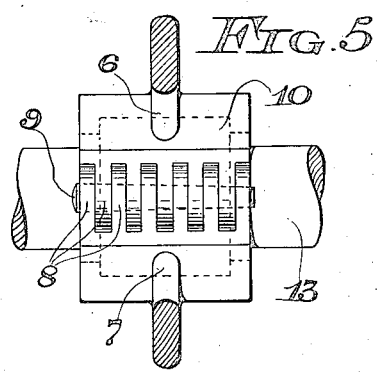
WITNESSES
INVENTOR
William Loeffler
By
ATTORNEY Patented Mar. 4, 1924.

1,485,621

UNITED STATES PATENT OFFICE.

WILLIAM LOEFFLER, OF SHEBOYGAN, WISCONSIN.

PULLEY.

Application filed July 23, 1921. Serial No. 487,073.

*To all whom it may concern:*

Be it known that I, WILLIAM LOEFFLER, a citizen of the United States, and resident of Sheboygan, in the county of Sheboygan and State of Wisconsin, have invented new and useful Improvements in Pulleys, of which the following is a description, reference being had to the accompanying drawings, which are a part of this specification.

The invention relates to power transmission devices and more particularly to pulleys.

The object of the invention is to provide a pulley which may be easily and quickly applied to its supporting shaft without the necessity of using set screws or keys.

The invention further consists in the several features hereinafter set forth and more particularly defined by claims at the conclusion hereof.

In the drawings: Fig. 1 is an elevation view of a pulley embodying the invention; Fig. 2 is a vertical sectional view through the hub of the pulley; Fig. 3 is a disassembled view of the device; Fig. 4 is a section taken on the line 4—4 of Fig. 1; Fig. 5 is a section taken on the line 5—5 of Fig. 1.

The pulley is made up of complementary half sections 6 and 7, for receiving clamping bushing hereinafter described, which sections may be joined together in any suitable manner. I prefer to join these sections together by providing the hub and rim portions of each section with a plurality of ears 8, the ears on one section interfitting or dovetailing those of the other section, as shown in detail in Fig. 5. A tapered pin 9 is passed through registering openings in each set of interfitting ears to hold the sections together and form a unitary pulley structure. This taper pin lock is very desirable as the sections may be readily disassembled by driving out the taper pins.

The hub 10 of the pulley thus formed is provided with recesses 11 and diametrically disposed projections 12. The pulley is connected to the shaft 13 by means of a split bushing or members 14 forming the halves of a clamping bushing engageable with the shaft. These halves have end portions 15 concentric with their bores and fitting the end openings 16 of the hub of the pulley, and they have eccentric or cam-shaped outer surfaces 17 which are engageable with the projections 12 and which on a turning of the assembled pulley in the direction of pull serve to bind the pulley to the shaft as these bushings form wedges between the projections 12 and the shaft whereby the bushing is tightly clamped to the shaft 13 and the pulley is held in wedging engagement with said bushings. The end portions 15 serve to properly center the pulley on the shaft and form shoulders with the cam surfaces insuring a proper seating of the bushing in the hub of the pulley.

From the foregoing description it will be noted that the pulley when assembled may be readily connected to or affixed to the shaft by turning the pulley with respect to the bushing to effect the eccentric clamping action above described, thus obviating the use of set screws requiring the use of wrenches or keys requiring special fitting and preventing the marring or weakening of the shaft.

I desire it to be understood that this invention is not limited to any specific form or arrangement of parts except in so far as such limitations are specified in the claims.

What I claim as my invention is:

1. The combination, with a shaft, of a pulley including separable sections, means for clamping said sections together, the hub of said pulley being recessed and provided with concentric end bores of larger diameter than said shaft, a plurality of clamping members forming a bushing surrounding said shaft and having end portions fitting the end bores of said hub and eccentric outer surfaces within the recessed portions of said hub, and concentric projections on said hub adjacent said recessed portions wedgingly engageable with said eccentric surfaces.

2. The combination with a shaft, of a pulley including separable sections and having a hub with a centrally disposed bore, means for clamping said sections together, and a plurality of clamping members forming a bushing surrounding the shaft and provided with eccentric outer surfaces engaged by concentric parts of said hub to wedgingly connect said pulley to the shaft and with portions concentric with and fitting the bore of said hub.

In testimony whereof, I affix my signature.

WILLIAM LOEFFLER.